United States Patent
Schlitzkus et al.

(10) Patent No.: US 10,018,526 B2
(45) Date of Patent: Jul. 10, 2018

(54) CONNECTION DEVICE FOR A PRESSURE SENSOR, PRESSURE SENSOR, AND METHOD FOR PRODUCING A CONNECTION DEVICE

(71) Applicant: Robert Bosch GmbH, Stuttgart (DE)

(72) Inventors: Michael Schlitzkus, Dietmannsried (DE); Stefan Lehenberger, Weitnau (DE); Dmitriy Aranovich, Pliezhausen (DE); Gerald Brinks, Waltenhofen (DE); Peter Diesel, Bad Hindelang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/119,459

(22) PCT Filed: Feb. 17, 2015

(86) PCT No.: PCT/EP2015/053268
§ 371 (c)(1),
(2) Date: Aug. 17, 2016

(87) PCT Pub. No.: WO2015/121484
PCT Pub. Date: Aug. 20, 2015

(65) Prior Publication Data
US 2017/0010170 A1    Jan. 12, 2017

(30) Foreign Application Priority Data

Feb. 17, 2014  (DE) .................. 10 2014 202 873
Aug. 14, 2014  (DE) .................. 10 2014 216 158

(51) Int. Cl.
*G01L 7/00*    (2006.01)
*G01L 9/00*    (2006.01)
(Continued)

(52) U.S. Cl.
CPC ........ *G01L 19/0061* (2013.01); *G01L 19/148* (2013.01); *B60T 8/3675* (2013.01);
(Continued)

(58) Field of Classification Search
CPC . G01L 19/148; G01L 19/0084; G01L 19/142; G01L 19/147; G01L 19/143;
(Continued)

(56) References Cited

U.S. PATENT DOCUMENTS 5,331,857 A * 7/1994 Levine .................. G01L 9/0052
73/706
5,587,535 A * 12/1996 Sasaki .................. G01L 9/0051
338/4
(Continued)

FOREIGN PATENT DOCUMENTS

DE         39 37 573 A1    5/1991
DE    10 2012 204 911 A1   10/2013

OTHER PUBLICATIONS

International Search Report corresponding to PCT Application No. PCT/EP2015/053268, dated May 4, 2015 (German and English language document) (5 pages).

*Primary Examiner* — Jonathan Dunlap
(74) *Attorney, Agent, or Firm* — Maginot, Moore & Beck LLP

(57) ABSTRACT

A connection device for a pressure sensor includes a supporting unit and a circuit board. The circuit board carries an electronic circuit having at least one of at least one electronic component and at least one electrical component. The supporting unit includes a multi-part main body that is electrically and mechanically connected to the circuit board via at least one soldered connection. The supporting unit further forms an external interface having at least one electrical contact point that enables tapping of at least one electrical output signal of the electronic circuit, and that is electrically
(Continued)

connected to a corresponding contact point of the circuit board via an electrical connection. A pressure sensor includes such a connection device, and a method pertains to producing such a connection device.

12 Claims, 6 Drawing Sheets

(51) Int. Cl.
  *G01L 19/00*      (2006.01)
  *B60T 8/36*      (2006.01)
  *G01L 19/14*      (2006.01)
  *G01D 11/30*      (2006.01)
  *G01D 11/24*      (2006.01)

(52) U.S. Cl.
  CPC .............. *G01D 11/24* (2013.01); *G01D 11/30* (2013.01); *G01L 9/0055* (2013.01); *G01L 19/0084* (2013.01); *G01L 19/14* (2013.01); *G01L 19/142* (2013.01); *G01L 19/143* (2013.01); *G01L 19/147* (2013.01)

(58) Field of Classification Search
  CPC ... G01L 19/0061; G01L 19/14; G01L 9/0055; G01D 11/24; G01D 11/30; B60T 8/3675
  USPC .......................................... 73/756, 726, 720
  See application file for complete search history.

(56) References Cited

U.S. PATENT DOCUMENTS

| | | | | |
|---|---|---|---|---|
| 5,629,486 A * | 5/1997 | Viduya | .................. | G01L 9/0051 73/720 |
| 5,802,912 A * | 9/1998 | Pitzer | .................... | G01L 9/0055 73/727 |
| 6,119,524 A * | 9/2000 | Kobold | .................... | G01L 19/08 73/724 |
| 6,389,903 B1 * | 5/2002 | Oba | .................... | G01L 19/0084 439/628 |
| 8,984,949 B2 * | 3/2015 | Staiger | .................... | G01L 9/006 73/114.38 |
| 9,046,436 B2 * | 6/2015 | Schlitzkus | ............ | G01L 19/148 |
| 2005/0230768 A1 | 10/2005 | Mei | | |
| 2008/0148860 A1 * | 6/2008 | Murakami | ............ | G01L 9/0002 73/726 |
| 2010/0192696 A1 * | 8/2010 | Schlitzkus | .............. | B60T 8/368 73/756 |
| 2012/0067130 A1 * | 3/2012 | Kaiser | .................... | B60T 8/368 73/706 |
| 2013/0104671 A1 * | 5/2013 | Schlitzkus | .......... | G01L 19/0084 73/862.381 |
| 2014/0022735 A1 * | 1/2014 | Yamagishi | ............... | H05K 1/16 361/728 |
| 2014/0331776 A1 * | 11/2014 | Petrarca | ................ | G01L 9/0051 73/723 |

* cited by examiner

CONNECTION DEVICE FOR A PRESSURE SENSOR, PRESSURE SENSOR, AND METHOD FOR PRODUCING A CONNECTION DEVICE

This application is a 35 U.S.C. § 371 National Stage Application of PCT/EP2015/053268, filed on Feb. 17, 2015, which claims the benefit of priority to Serial Nos. DE 10 2014 202 873.6 filed on Feb. 17, 2014 and DE 10 2014 216 158.4 filed on Aug. 14, 2014 in Germany, the disclosures of which are incorporated herein by reference in their entirety.

The disclosure is based on a connection device for a pressure sensor and on a corresponding pressure sensor in and also on a method for producing a connection device for a pressure sensor.

BACKGROUND

DE 10 2012 204 911 A1 discloses a pressure sensor unit having a protective sleeve, and at least one measuring cell, a circuit carrier and a connection device having a circuit board that is arranged perpendicular to the circuit carrier, said circuit board supporting an electronic circuit having at least one electronic and/or electrical component, and a supporting unit are arranged in said protective sleeve. The measuring cell comprises at least one connection site by way of which it is possible to tap at least one electrical output signal of the measuring cell, wherein the circuit carrier comprises an internal interface that taps the at least one electrical output signal of the measuring cell and supplies said signal to the electronic circuit. The supporting unit comprises an external interface by way of which it is possible to tap at least one electrical output signal of the electronic circuit that is arranged on the circuit board. The internal interface is formed on a first end of the protective sleeve and the external interface is formed on a second end of the protective sleeve. The supporting unit comprises a base body having an outer contour that comprises a first joining geometry that is a part of the external interface and guides and/or electrically contacts external contact elements, and a second joining geometry by way of which the supporting unit is joined to the circuit board. In addition, the supporting unit supports by way of the outer contour the circuit board that has been joined by way of the second joining geometry against the inner contour of the protective sleeve. The circuit carrier is preferably embodied at least from a synthetic material substrate of synthetic material that can be galvanized and a second synthetic material that cannot be galvanized, wherein conductor tracks and electrically conductive contact sites surfaces are produced in a galvanic process as a metal surface coating on the galvanized synthetic material.

SUMMARY

The connection device in accordance with the disclosure for a pressure sensor, and the pressure sensor in accordance with the disclosure have in contrast the advantage that the electrical and mechanical connection of the supporting unit to the circuit board is achieved when populating the circuit board with the at least one electronic and/or electrical component. This means that complex and additional adhesive dispensing processes and curing processes for mechanically connecting the supporting unit to the circuit board can be replaced in an advantageous manner by means of a standardized soldering paste printing procedure having a subsequent soldering process in the continuous furnace. It is possible to populate the circuit boards directly in the circuit board panels with the supporting units by means of the multi-part embodiment of the base body. As a consequence, it is possible for the electrical and mechanical connection of the supporting unit to the circuit board to be integrated into the otherwise required standard process for populating the circuit board. The mechanical and electrical connection can be achieved by means of soldering paste that is applied by means of a soldering paste printing standard process when populating the circuit board. The final electrical and mechanical connection is achieved by means of the solder connection that is produced in the continuous oven after populating the circuit board.

In a similar manner to the prior art, the supporting unit combines the functionality of the external interface and a supporting function for the circuit board so that the circuit board is electrically connected to an external circuit or control device and can be supported against an inner contour of a protective sleeve. Consequently, embodiments of the supporting unit form the connecting element between the circuit board or sensor unit to the outer world.

Embodiments of the supporting unit in accordance with the disclosure render it possible to optimize the installation space required by the sensor unit by means of supporting the circuit board on the inner contour of the protective sleeve, said circuit board being positioned essentially perpendicular with respect to the circuit carrier. In addition, it is possible to integrate additional functions such as guiding and/or electrically contacting external contact partners and a protector that prevents physical contact with the contact surfaces of the circuit board. Furthermore, it is possible to provide electrical and/or electronic components and/or conductor tracks for a protective circuits and/or an additional grounding path. In addition, it is possible to provide contact surfaces and/or guiding means for a connection that is bound to requirements to predetermined customer interfaces or to a peripheral device. As a consequence, it is possible depending upon the embodiment of the supporting unit to adjust the sensor unit in a variable manner to the suit various customer interfaces.

Embodiments of the present disclosure provide a connection device for a pressure sensor having a supporting unit and a circuit board that supports an electronic circuit having at least one electronic and/or electrical component. The supporting part forms an external interface having at least one electrical contact site by way of which it is possible to tap at least one electrical output signal of the electronic circuit. The at least contact site is electrically connected to a corresponding contact site of the circuit board by way of an electrical connection. In accordance with the disclosure, the supporting unit comprises a multi-part body that is connected to a circuit board in an electrical and mechanical manner by means of at least one solder connection.

In addition, embodiments of the present disclosure provide a pressure sensor having a protective sleeve and at least one measuring cell, a circuit carrier and a connection device in accordance with the disclosure having a circuit board that is arranged perpendicular with respect to the circuit carrier, said circuit board supporting an electronic circuit having at least one electronic and/or electrical component, and a supporting unit are arranged in said protective sleeve. The circuit carrier comprises an internal interface that taps at least one electrical output signal of the measuring cell and supplies said signal to the electronic circuit. It is possible to tap an output signal of the electronic circuit by way of an external interface. In addition, the supporting unit supports the circuit board against an inner contour of the protective sleeve by way of an outer contour.

The pressure sensor in accordance with the disclosure can be constructed in a particularly compact manner since the circuit carrier only embodies the internal interface and is arranged on the first end of the protective sleeve and the circuit board is simultaneously embodied as a structural component within the protective sleeve and is joined on the first end face to the circuit carrier. The circuit board is joined on the second end face to the supporting unit in accordance with the disclosure and said protection unit supports the circuit board against the protection sleeve. As a consequence, it is possible to advantageously reduce the construction height of the sensor unit.

Advantageous improvements of the connection device for a pressure sensor according to this disclosure and advantageous improvements of the pressure sensor according to this disclosure are rendered possible by means of the measures and further developments that are disclosed in the claims, detailed description, and drawings.

It is particularly advantageous that it is possible to produce the at least one electrical connection between the at least one contact site of the external interface and the at least one corresponding contact site of the circuit board by way of at least one via that is formed in the base body and said via can be electrically connected to at least one associated mating contact site in the base body and said mating contact site can in turn be connected in an electrical and mechanical manner to the at least one contact site of the circuit board by way of the at least one solder connection.

In an advantageous embodiment of the connection device in accordance with the disclosure, the base body of the supporting unit can comprise two half shells, wherein each half shell comprises at least one contact site of the external interface. So as to render it possible to position the half shells more easily, the half shells can in each case comprise at least one first joining geometry that cooperates with at least one second joining geometry of the circuit board so as to correctly position the half shells when producing the mechanical connection between the half shells and the circuit board. The half shells can comprise in each case a third joining geometry and a fourth joining geometry for an improved guiding arrangement during assembly, wherein a third joining geometry of a first half shell cooperates with a fourth joining geometry of a second half shell and a third joining geometry of the second half shell cooperates with a fourth joining geometry of the first half shell so as to correctly position the half shells with respect to one another.

It is preferred that the half shells in each case are embodied as a synthetic material injection molded part and a lead frame is embedded in said synthetic material injection molded part, said lead frame forming the contact sites and vias of the external interface. Alternatively, the half shells are embodied at least from one synthetic material substrate of a first synthetic material that can be galvanized and a second synthetic material that cannot be galvanized, wherein conductor tracks and contact sites can be attached as a metal surface coating by means of a galvanic process to the synthetic material that can be galvanized. Alternatively, the synthetic material substrate can be produced from the second synthetic material, which cannot be galvanized, and injection molded at least in part with the first synthetic material that can be galvanized. The supporting unit can be produced by way of example by means of an MID-2K-technique, in other words the injection molded supporting unit (Molded interconnected device) is embodied from two components that comprise a first synthetic material that can be galvanized, said synthetic material at least in part being injection molded with a second synthetic material that cannot be galvanized. Alternatively, the second synthetic material that cannot be galvanized can also be injection molded at least in part with the first synthetic material that can be galvanized. The in part protruding surfaces of the substrate are coated by means of a galvanic process with a metal surface so that the conductor tracks and contact sites are produced. The use of such an injection molded MID supporting unit is particularly suitable in the present application since as a result of the improved design flexibility and the improved integration of electrical and mechanical functions, it is possible to push forward the miniaturization of the connection device. The supporting unit can also be produced as desired by means of an MID that is directly structured by means of a laser. The MID supporting unit is then embodied from an injection molded part in which the locations of the conductor tracks and contact means are structured with the aid of a laser and afterwards coated with a metal surface by means of a galvanic process.

In a further advantageous embodiment of the connection device in accordance with the disclosure, at least one EMC contact can be arranged on an outer contour of the base body. The EMC contact can be embodied by way of example as an electrically conductive coating that covers at least in part the outer contour of the base body in order to form an additional measuring path to the inner contour of the protective sleeve.

Alternatively, the EMC contact can be embodied as a resilient contact tongue that produces an electrical connection to the inner contour.

In an advantageous embodiment of the pressure sensor in accordance with the disclosure, the base body of the supporting unit can comprise a protruding edge that completes the protective sleeve in the joined state. As a consequence, it is possible to improve the protector that prevents physical contact with the pressure sensor and the protector that protects against foreign bodies penetrating the pressure sensor.

Exemplary embodiments of the disclosure are illustrated in the drawings and are further explained in the description hereinunder. In the drawings, identical reference numerals refer to components or elements that perform identical or similar functions.

DETAILED DESCRIPTION

Figure 1:
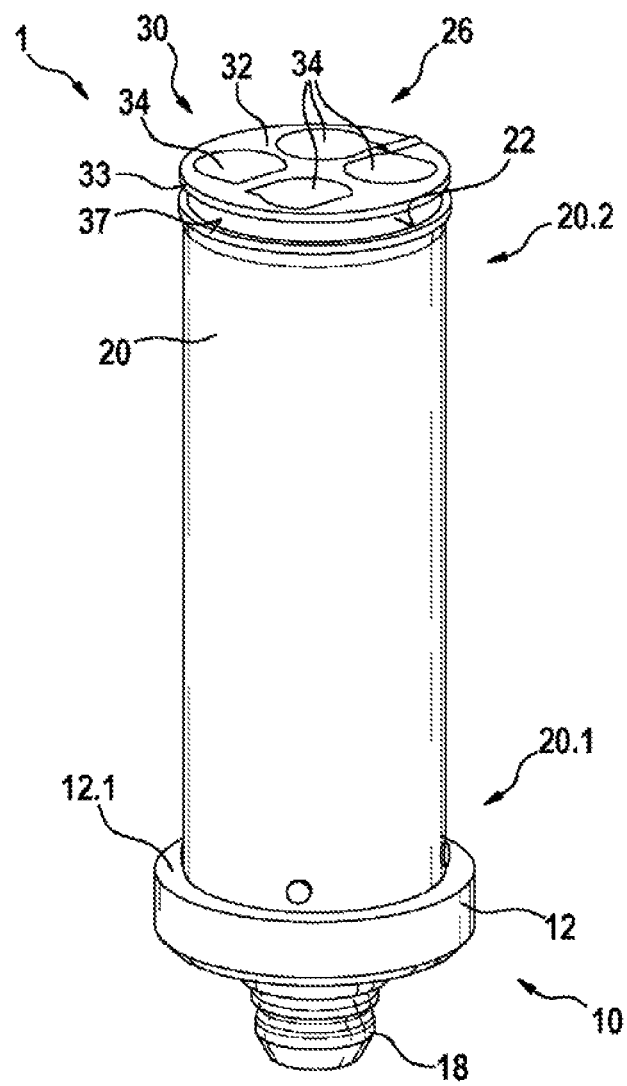
FIG. 1 illustrates a schematic perspective view of an exemplary embodiment of a pressure sensor in accordance with the disclosure.
Figure 2:
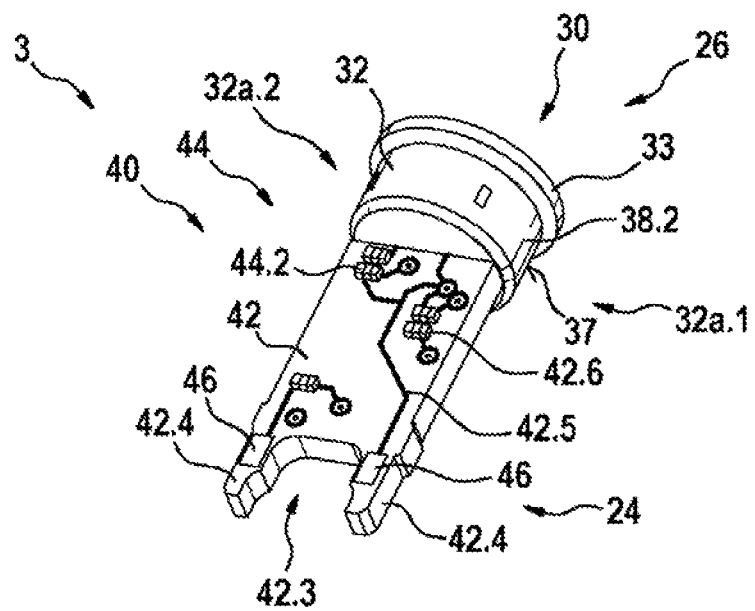
FIG. 2 illustrates a schematic perspective view of an exemplary embodiment of a connection device in accordance with the disclosure for the pressure sensor in accordance with the disclosure in FIG. 1.

As is evident in FIGS. 1 to 12, the illustrated exemplary embodiment of the pressure sensor 1 in accordance with the disclosure comprises a protective sleeve 20 and at least one measuring cell 50 that ascertains in particular a hydraulic pressure of a solenoid valve-controlled fluid in a vehicle braking system, a circuit carrier 60 and a connection device 3 for the pressure sensor 1 having a circuit board 40, which is positioned essentially perpendicular with respect to the end face of the circuit carrier 60, and a supporting unit 30 are arranged in said protective sleeve. The circuit board 40 is embodied in such a manner that it can be populated on both sides and comprises an electronic circuit 44 having at least one electronic and/or electrical component 44.1, 44.2 that by way of example amplifies a signal and/or processes a raw signal of the measuring cell 50. In the case of the illustrated exemplary embodiment, the electronic circuit 44 comprises an application-specific integrated circuit (ASIC) 44.1 and a corresponding protective circuit having multiple electrical and/or electronic components 44.2. Electrical connections between the ASIC 44.1 and the electrical and/or electronic components 44.2 are produced by means of conductor tracks 42.5 and solder sites 42.6. The measuring cell 50 converts the hydraulic pressure into at least one electrical output signal and comprises at least one connection site 54 by way of which it is possible to tap the at least one electrical output signal of the measuring cell 50. The circuit carrier 60 comprises an internal interface 24 that taps the at least one electrical output signal of the measuring cell 50 and supplies said signal to the electronic circuit 44. In addition, it is possible to tap an output signal of the electronic circuit 44 by way of an external interface 26. The internal interface 24 is formed on a first end 20.1 of the protective sleeve 20, and the external interface 26 is formed on a second end 20.2 of the protective sleeve 20. The protective sleeve 20 protects the inner parts of the pressure sensor 1 against any excessive mechanical loading.

The supporting unit 30 for the circuit board 40 forms the external interface 26 having at least one electrical contact site 34 by way of which it is possible to tap at least one electrical output signal of the electronic circuit 44. The at least one contact site 34 is electrically connected by way of an electrical connection to a corresponding contact site 48 of the circuit board 40. In accordance with the disclosure, the supporting unit 30 comprises a multi-part base body 32 that is connected in an electrical and mechanical manner to the circuit board 40 by means of at least one solder connection.

As is further evident in FIGS. 1 to 12, the base body 32 of the supporting unit 30 comprises a cylindrical shape and in the illustrated exemplary embodiments two half shells 32a, 32b, 32c that comprise in each case at least one contact site 34 of the external interface 26. The at least one electrical connection between the at least one contact site 34 of the external interface 26 and the at least one corresponding contact site 48 of the circuit board 40 is produced by way of at least one via 35 that is formed in the base body 32, said via being electrically connected to at least one associated mating contact site 36 in the base body 32, said mating contact site being in turn connected in an electrical and mechanical manner to the at least one contact site 48 of the circuit board 40 by way of the at least one solder connection. In the case of the illustrated exemplary embodiments, the supporting unit 30 comprises four contact sites 34, wherein two contact sites 34 are arranged on each half shell 32a, 32b, 32c.

As is evident in FIGS. 4 to 8, the half shells 32a, 32b, 32c comprise in each case at least one first joining geometry 39 that are embodied by way of example as a bulge. In the case of the illustrated exemplary embodiments, in each case two first joining geometries 39 that are embodied as bulges are provided. The first joining geometries 39 cooperate with at least one second joining geometry 42.1 of the circuit board so as to correctly position the half shells 32a, 32b, 32c when producing the mechanical connection between the half shells 32a, 32b, 32c and the circuit board 40. As is further evident in FIGS. 9 to 12, in the case of the illustrated exemplary embodiments in each case two second joining geometries 42.1 that are embodied as cut-outs are provided on the circuit board 40 and the dimensions of said joining geometries are tailored to suit the dimensions of the first joining geometries 39 that are embodied as bulges.

As is further evident in FIG. 2 and FIGS. 4 to 8, the half shells 32a, 32b, 32c comprise in each case a third joining geometry 32.3 that is embodied by way of example as a receiving aperture, and a fourth joining geometry 32.4 that is embodied by way of example as a guiding dome. A third joining geometry 32.3 of a first half shell 32a.1 cooperates with a fourth joining geometry 32.4 of a second half shell 32a.2 and a third joining geometry 32.3 of the second half shell 32a.2 cooperates with a fourth joining geometry 32.4 of the first half shell 32a.1 so as to correctly position the half shells 32a.1, 32a.2 with respect to one another.

The supporting unit 30 is inserted on the second end 20.2 of the protective sleeve 20 in such a manner that it can move in the clearance available and supports by way of the outer contour 37 the circuit board 40 against an inner contour 22 of the protective sleeve 20. In the first four exemplary embodiments, the supporting unit 30, 30a, 30b, 30c in each case comprises a second joining geometry 32.2, 32.2a, 32.2b, 32.2c that are embodied as contact receiving pockets for guiding the external contact means.

As is further evident in FIG. 1, the protective sleeve 20 in the illustrated exemplary embodiment is embodied as a hollow cylinder. The protective sleeve 20 is joined on the first end 20.1 to a sensor carrier 10 that comprises a fastening flange 12 and a measuring connector 18 that is embodied as a self-clinching connector. The fastening flange 12 comprises a flange edge 12.1 and the protective sleeve 20 is supported on said flange edge and the pressure sensor 1 having a fluid block (not illustrated) can be fixed in place by way of said flange edge. In addition, the fastening flange 12 comprises a stepped flange surface 14, wherein the step 16 between the flange edge 12.1 and the flange surface 14 is used in the illustrated exemplary embodiments as a connecting region and the protective sleeve 20 is pressed onto said connecting region. In addition, the protective sleeve 20 can be welded to the fastening flange 12 at the transition of the step 16 to the flange edge 12.1.

Figure 3:
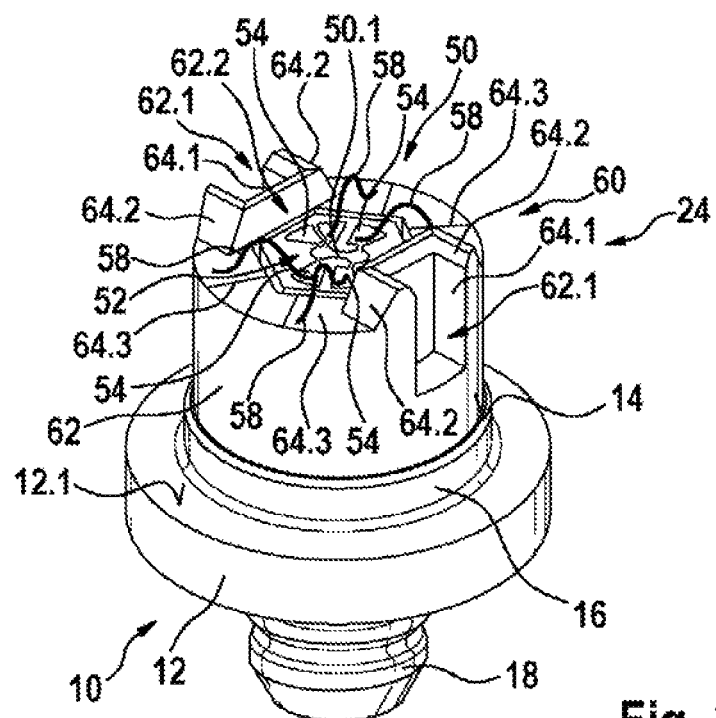
FIG. 3 illustrates a schematic perspective view of a sensor carrier having a joined circuit carrier for the pressure sensor in accordance with the disclosure in FIG. 1.

As is further evident in FIG. 3, the base body 62 of the circuit carrier 60 is embodied in the illustrated exemplary embodiment as a hollow cylinder having an inner joining geometry 62.2 that is embodied as a polygon and is tailored to suit an outer contour 56 of the measuring cell 50 and surrounds the measuring cell 50. It is possible by means of the embodiment as a polygon and the straight edges that are associated therewith for the measuring cell 50 to be cut out of a base plate in a simple manner during the production process. It is preferred that the outer contour 56 of the measuring cell 50 and consequently the inner joining geometry 62.2 of the circuit carrier is embodied as a regular hexagon or octagon. The outer joining geometry 62.1 on the base body 62 of the circuit carrier 60 comprises two receiving pockets having protruding collars that comprise in each case at least one first contact means 64.1 so as to electrically contact the circuit board 40. The at least one first contact means 64.1 is connected by way of an outer-lying conductor track 64.2 on the base body 62 of the circuit carrier 60 to at least one second contact means 64.3 so as to electrically contact the measuring cell 50. The circuit board 40 comprises on the base body 42 a recess 42.3 that is delimited on two opposite-lying sides in each case by a guiding arm 42.4. The two guiding arms 42.4 of the circuit board 40 are joined in each case to a receiving pocket of the outer joining geometry 62.1 of the circuit carrier 60. In the illustrated exemplary embodiment, the two guiding arms 42.4 of the circuit board 40 are guided by way of inner guiding edges in the receiving pockets 62.1 of the circuit carrier 60. In addition or as an alternative thereto, the guiding arms 42.4 of the circuit board 40 can also be guided by way of external guiding edges on the inner contour 22 of the protective sleeve 20. The circuit board 40 can when required comprise a predetermined small angle of incline with respect to the perpendicular vertical axis of the sensor unit 1 by means of correspondingly shaping the receiving pockets 62.1.

As is further evident in FIG. 2 and FIGS. 9 to 12, the base carrier 42 of the circuit board 40 that is positioned essentially perpendicular to the end surface of the circuit carrier 60 comprises contact surfaces 46 in the region of the guiding arms 42.4 and said contact surfaces form the internal electrical interface 24 with corresponding first contact sites 64.1 or contact surfaces in the region of the outer joining geometry 62.1 on the base body 62 of the circuit carrier 60. In the region of the second joining geometry 42.1, the base carrier 42 of the circuit board 40 comprises contact sites 48 that are contacted by the corresponding mating contact sites 36 of the half shells 32a, 32b, 32c of the base body 32 of the supporting unit 30, said mating contact sites being illustrated in FIGS. 4 to 8.

Figure 4:
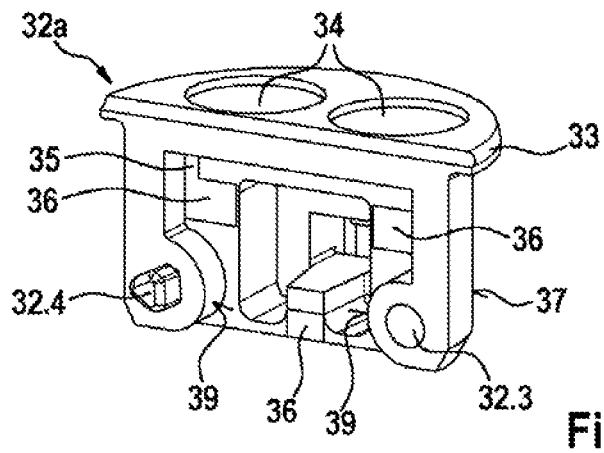
FIGS. 4 and 5 illustrate in each case a schematic perspective view of a first exemplary embodiment of a half shell for a supporting unit of the connection device in accordance with the disclosure for a pressure sensor in FIG. 2.
Figure 5:
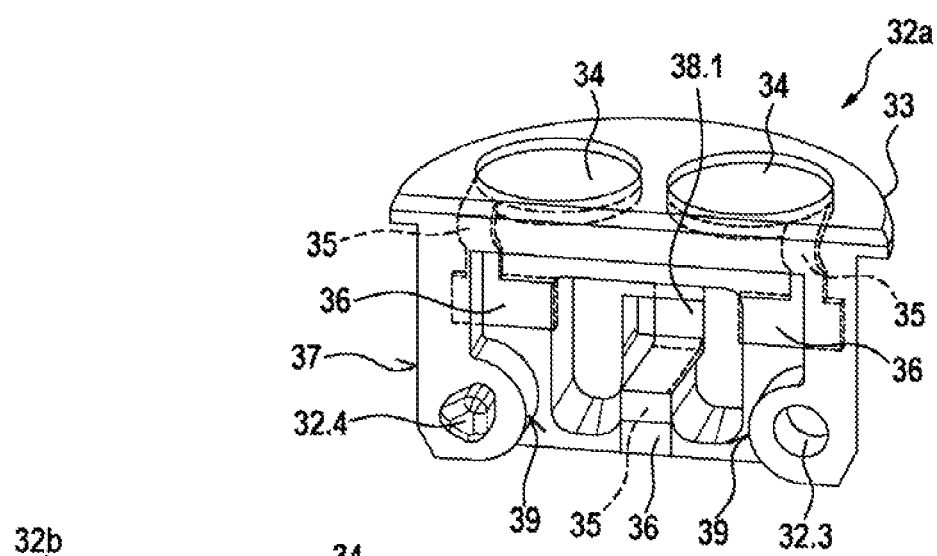

As is further evident in FIG. 4 and the transparent illustration in FIG. 5, the half shells 32a of the base body 32 of the supporting unit 30 are embodied in the illustrated first exemplary embodiment in each case as a synthetic material injection molded component in which a lead frame is embedded that forms the contact sites 34 of the external interface 26 and also the vias 35 and the mating contact sites 36. In addition, an EMC contact that is embodied as an elastic resilient tongue 38.1 is arranged on the outer contour 37 of the base body 32, said EMC contact in the joined state producing an electrical connection to the inner contour 22 of the protective sleeve 20.

Figure 6:
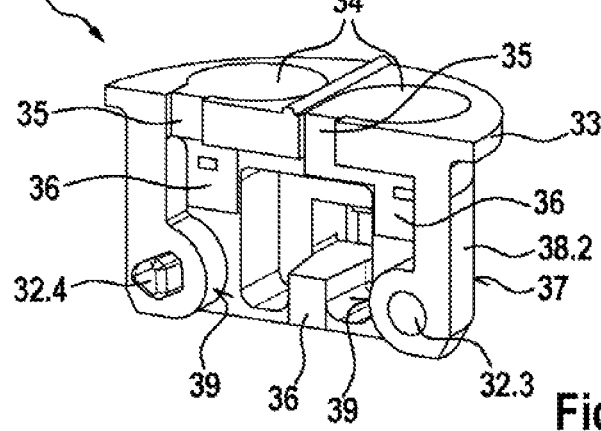
FIG. 6 illustrates a schematic perspective view of a second exemplary embodiment of a half shell for a supporting unit of the connection device in accordance with the disclosure for a pressure sensor in FIG. 2.

As is further evident in FIG. 6, the half shells 32b of the base body 32 of the supporting unit 30 in the illustrated second exemplary embodiment are produced in each case as an injection molded part using the MID-1K-technique (MID: molded interconnected device), said injection molded part being directly structured by means of a laser. The MID half shell 32b is embodied from an injection molded part in which the positions of the contact sites 34 of the external interface 26 and also the vias 35 or conductor tracks and the mating contact sites 36 are structured with the aid of a laser and afterwards are coated by means of a galvanic process with a metal surface. In addition, the EMC contact is embodied on the outer contour 37 of the base body 32 as an electrically conductive coating 38.2 that in the joined state produces an electrical connection to the inner contour 22 of the protective sleeve 20.

Figure 7:
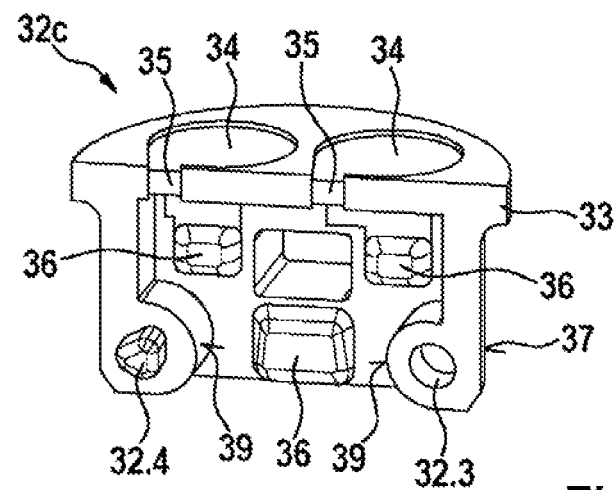
FIGS. 7 and 8 illustrate in each case a schematic perspective view of a third exemplary embodiment of a half shell for a supporting unit of the connection device in accordance with the disclosure for a pressure sensor in FIG. 2.
Figure 8:
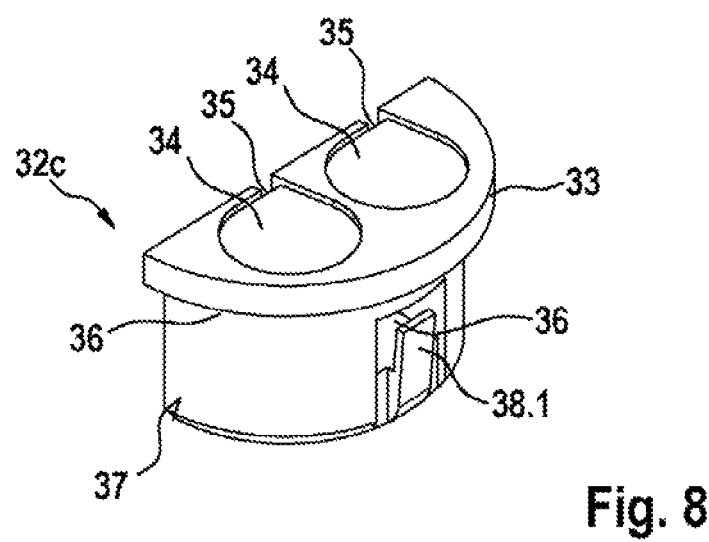

As is further evident in FIGS. 7 and 8, the half shells 32c of the base body 32 of the supporting unit in the illustrated third exemplary embodiment are produced in each case as a synthetic material injection molded part using the MID-2K-technique (MID: molded interconnected device), in other words the injection molded half shells 32c of the base body 32 of the supporting unit 30 are embodied from two components that comprise a first synthetic material that can be galvanized and that is at least in part injection molded with a second synthetic material that cannot be galvanized. Alternatively, the second material that cannot be galvanized can also be at least in part injection molded with the first synthetic material that can be galvanized. The in part protruding surfaces of the substrate are coated with a metal surface by means of a galvanic procedure so that the contact sites 34 of the external interface 26 and also the vias 35 or conductor tracks and the mating contact sites 36 are produced. In addition, the EMC contact is formed on the outer contour 37 of the base body 32 in a manner similar to the first exemplary embodiment as an elastic resilient tongue 38.1 that in the joined state produces an electrical connection to the inner contour 22 of the protective sleeve 20.

The use of such injection molded half shells 32a, 32b, 32c is particularly suitable in the present application since, as a result of the improved design flexibility and the improved integration of electrical and mechanical functions, it is possible to push forward the miniaturization of the connection device.

In the illustrated exemplary embodiment, the circuit carrier 60 is also produced using the so-called MID technique and is embodied from at least one synthetic material substrate that is embodied from a first synthetic material that can be galvanized and a second synthetic material that cannot be galvanized. The second contact sites 64.3 are arranged as bonding surfaces on an end face of the circuit carrier 60 and said contact sites are connected by way of exterior-lying conductor tracks 64.2 to the corresponding first contact sites 64.1 that are embodied as contact surfaces, said first contact sites being arranged in the receiving pockets of the outer joining geometry 62.1. The first contact sites 64.1, the conductor tracks 64.2 and the second contact sites 64.3 of the circuit carrier 60 are in each case embodied as a metal layer having predetermined dimensions and are applied in a galvanic process onto the synthetic material, which can be galvanized, of the circuit carrier 60. In the illustrated exemplary embodiment, the circuit carrier 60 is produced as a synthetic material injection molded part using the MID-1K technique (MID: molded interconnected device) that is directly structured by means of a laser. Alternatively, the circuit carrier 60 can also be formed in a manner similar to the half shells 32c of the base body 32 of the supporting unit 30 as a synthetic material injection molded part using the MID-2k technique or as a synthetic material injection molded part in which a lead frame is embedded that embodies the first contact sites 64.1, the second contact sites 64.3 and the conductor tracks 64.2.

As is further evident in FIG. 3, the fastening flange 12 can be pressed or connected by way of example by means of a self-clinching connection 18 to the fluid block (not illustrated). In addition to the above described connecting region 16 for pressing on or welding the protective sleeve 20, connecting apertures that are not visible are integrated into the flange surface 14, said connecting apertures receiving connecting spigots that are not visible and are arranged on the circuit carrier 60 in order to render possible a rotationally-secure connection of the circuit carrier 60 to the sensor carrier 10. An adhesive layer can be applied to the flange surface 14 so as to join the circuit carrier 60 to the sensor carrier 10. Naturally, other suitable connecting techniques that are known to the person skilled in the art can be used in order to join the circuit carrier 60 to the sensor carrier 10 in a rotationally-secure manner. By way of example, a circumferential receiving groove can thus be integrated on the fastening flange 12 of the sensor carrier 10 and said receiving groove can form a clip connection with latching lugs or latching brackets that are formed on the base body 62 of the circuit carrier 60. The measuring cell 50 that is embodied as a pressure measuring cell is placed on a tubular carrier (not visible) of the fastening flange 12 in such a manner that a measuring membrane 50.1 of the measuring cell 50 is deformed in dependence upon the pressure of the fluid in the hydraulic block. The deformation of the measuring membrane 50.1 is ascertained by a measuring bridge 52. The measuring bridge 52 is connected to four contact sites 54 that are electrically connected in each case by way of bonding wires 58 to the second contact sites 64.3 that are embodied as bonding surfaces of the circuit carrier 60.

The measuring cell 50 is welded to the sensor carrier 10 during the production of the pressure sensor 1. The circuit carrier 60 is subsequently pressed by way of the connecting spigots into the connecting apertures and adhered thereto, wherein the holding adhesive layer is introduced between the flange surface 14 and a base surface of the circuit carrier 60. After attaching the holding adhesive later, the protective sleeve 20 is pressed on and finally is fixed using spot welding.

Figure 9:
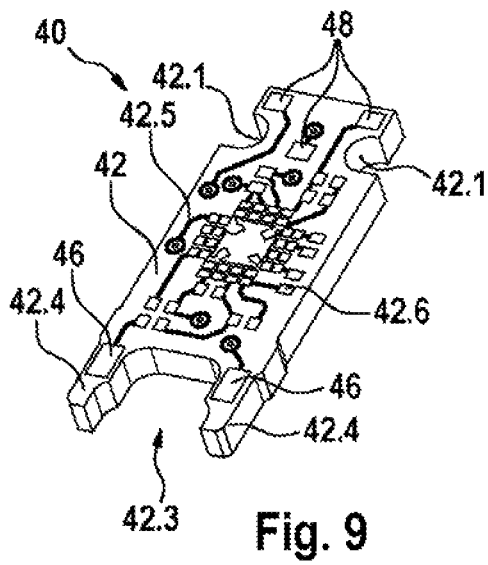
FIGS. 9 to 12 illustrate in each case a schematic perspective view of various production states during the production of the connection device in accordance with the disclosure for a pressure sensor in FIG. 2.
Figure 10:
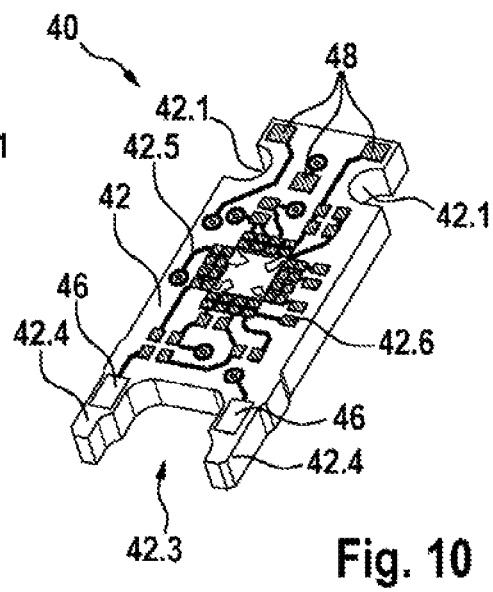
Figure 11:
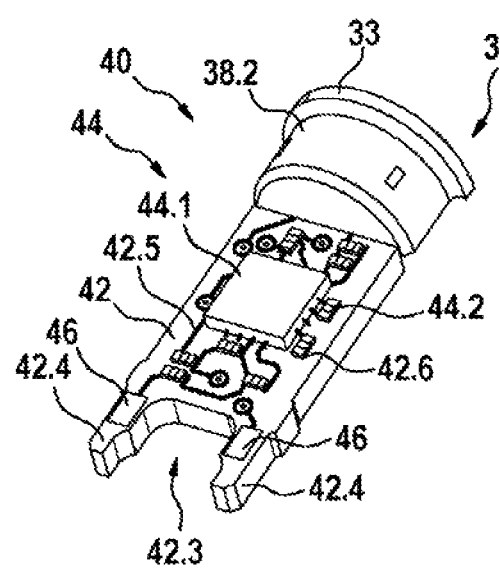
Figure 12:
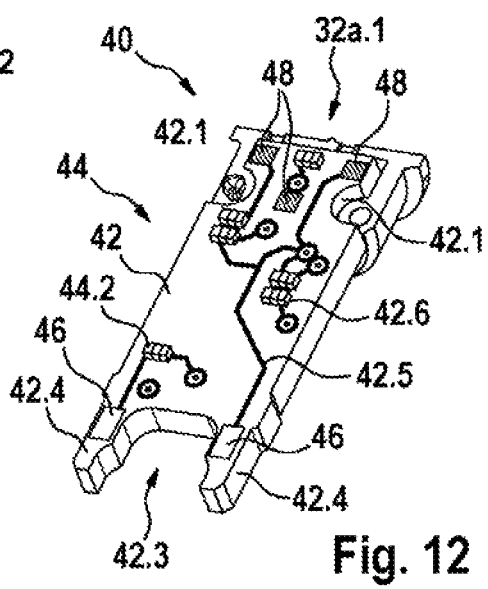

As is further evident in FIG. 9, conductor tracks 42.5, solder sites 42.6 for the application-specific integrated circuit (ASIC) 44.1 or the electrical and/or electronic components 44.2, the contact surfaces 46 for the electrical connection to the circuit carrier 60 and the contact sites 48 for the electrical and mechanical connection to the supporting unit 30 are arranged on the printed surface of the circuit board 40. As is further evident in FIG. 10, the solder sites 42.6 for the application-specific integrated circuit (ASIC) 44.1 or the electrical and/or electronic components 44.2 and the contact sites 48 for the electrical and mechanical connection to the supporting unit 30 are printed with solder paste. As is further evident in FIG. 11, subsequently the front side of the circuit board is initially populated with the application-specific integrated circuit (ASIC) 44.1, the electrical and/or electronic components 44.2 and with the first half shell 32*a*.1. As is further evident in FIG. 12 and FIG. 2, the rear face of the circuit board 40 is then populated with the corresponding electrical and/or electronic components 44.2 and with the second half shell 32*a*.2. After the populating procedure, the populated circuit board 40 passes through a continuous oven in which the solder connections are produced.

Figure 13:
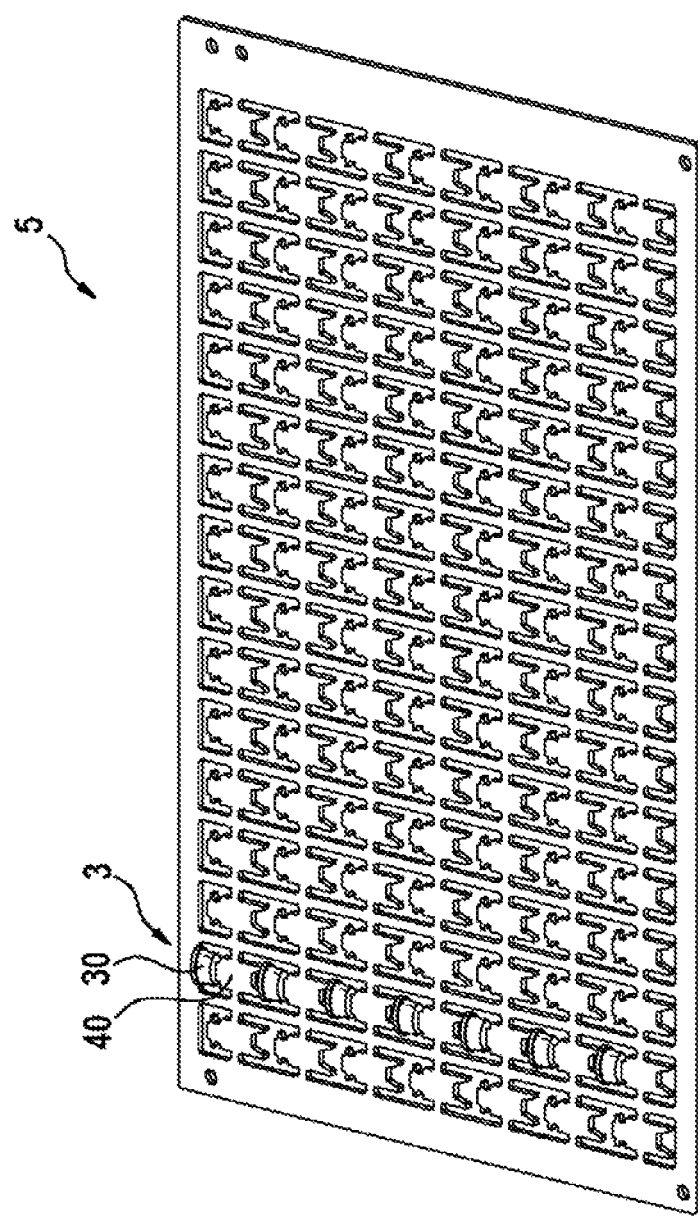
FIG. 13 illustrates a schematic perspective view of a circuit board panel.

As is evident in FIG. 13, multiple connection devices 3 that are produced simultaneously in a circuit board panel 5 in that the half shells 32*a*, 32*b*, 32*c* of the base body 32 of the supporting unit 30 are simultaneously electrically and mechanically connected to the circuit board 40 during the procedure of populating the circuit board 40 simultaneously with the at least one electronic and/or electrical component 44.1, 44.2.

After milling out the connection device 3 from the circuit board panel 5, the circuit board 40 is inserted into the receiving pockets of the outer joining geometry 62.1 on the base body 62 of the circuit carrier 60 and where required is fixed at that location using holding adhesive and conductive adhesive in order to ensure an electrically conductive connection between the circuit carrier 60 and the circuit board 40 and to fix the circuit board 40. The holding adhesive is integrated by way of example on base surfaces of the receiving pockets 62.1 of the circuit carrier 60 and the conductive adhesive is by way of example applied to the contact surfaces 46 of the circuit board 40. Alternatively, the first contact sites 64.1 can be embodied on the base body 62 of the circuit carrier as resilient elastic contact elements that exert a force on the contact surfaces 46 of the circuit board 40 perpendicular to the direction of insertion of the circuit board 40 and simultaneously fix the circuit board 40 that is inserted into the receiving pockets of the outer joining geometry 62.1 so that it is possible to omit the holding adhesive and the conductive adhesive.

The described connection device in accordance with the disclosure is suitable in particular for use in a pressure sensor for braking systems of motor vehicles but is not limited to this. The connection device in accordance with the disclosure can thus also be used by way of example for optical and/or acoustic measuring cells. A plurality of pressure sensors is used in particular in the case of braking systems in premium class cars where the installation space is limited. A pressure sensor whose requirements with regard to installation space have been minimized is therefore suitable for this application.

Embodiments of the connection device in accordance with the disclosure advantageously support the circuit board against the protective sleeve and prevent the circuit board from tipping.

The invention claimed is:

1. A connection device for a pressure sensor, comprising:
a supporting unit including a multi-part base body;
a circuit board electrically and mechanically connected to the multi-part base body of the supporting unit via at least one solder connection; and
an electronic circuit supported by the circuit board, and having at least one component that is at least one of electronic and electrical;
wherein:
the supporting unit defines an external interface having at least one electrical contact site that enables tapping at least one electrical output signal of the electronic circuit;
the at least one electrical contact site is electrically connected to at least one corresponding contact site of the circuit board;
the base body defines at least one mating contact site;
the base body includes at least one via that forms the at least one electrical connection between the at least one contact site of the external interface and the at least one corresponding contact site of the circuit board by;
the via is electrically connected to the at least one mating contact site in the base body; and
the at least one mating contact site is electrically and mechanically connected by at least one solder connection to the at least one corresponding contact site of the circuit board.

2. The connection device as claimed in claim 1, wherein:
the base body of the supporting unit includes two half shells; and
each half shell respectively defines at least one contact site of the external interface.

3. The connection device as claimed in claim 2, wherein:
each half shell includes at least one first joining geometry;
the circuit board includes at least one second joining geometry that corresponds to each at least one first joining geometry, each first joining geometry configured to cooperate with a corresponding second joining geometry to locate the half shells relative to each other and enable the mechanical connection between the half shells of the main body and the circuit board.

4. The connection device as claimed in claim 3, wherein:
each half shell includes a third joining geometry and a fourth joining geometry, the third joining geometry of each half shell configured to cooperate with the fourth joining geometry of the other half shell to locate the half shells with respect to each other.

5. The connection device as claimed in claim 1, further comprising:
at least one EMC contact positioned on an outer contour of the base body.

6. A pressure sensor, comprising:
a protective sleeve that defines an inner contour;
at least one measuring cell;
a circuit carrier that includes an internal interface that taps at least one electrical output signal of the at least one measuring cell; and
a connection device that includes:
a circuit board that is positioned in the protective sleeve so as to be perpendicular to the circuit carrier;
a supporting unit positioned in said protective sleeve, the supporting unit including a multi-part base body that is electrically and mechanically connected to the circuit board via at least one solder connection; and
an electronic circuit supported by the circuit board and having at least one component that is at least one of electronic and electrical, wherein the internal interface of the circuit carrier supplies the at least one electrical output signal to the electronic circuit;
the supporting unit defining an external interface having at least one electrical contact site that enables tapping at least one output signal of the electronic circuit; and
the supporting unit defining an outer contour that supports the circuit board against the inner contour of the protective sleeve;
wherein:
the base body of the supporting unit includes two half shells; and
each half shell respectively defines at least one contact site of the external interface.

7. The pressure sensor as claimed in claim 6, wherein the base body of the supporting unit defines a protruding edge that closes the protective sleeve in a joined state.

8. The pressure sensor as claimed in claim 6 further comprising at least one EMC contact positioned on an outer contour of the base body and connected in an electrically conductive fashion on the outer contour of the base body to the inner contour of the protective sleeve.

9. The pressure sensor as claimed in claim 6, wherein:
the base body defines at least one mating contact site;
the base body includes at least one via that forms the at least one electrical connection between the at least one contact site of the external interface and the at least one corresponding contact site of the circuit board;
the via is electrically connected to the at least one mating contact site in the base body; and
the at least one mating contact site is electrically and mechanically connected by at least one solder connection to the at least one corresponding contact site of the circuit board.

10. The pressure sensor as claimed in claim 6, wherein:
each half shell includes at least one first joining geometry; and
the circuit board includes at least one second joining geometry that corresponds to each at least one first joining geometry, each first joining geometry configured to cooperate with a corresponding second joining geometry to locate the half shells relative to each other and enable the mechanical connection between the half shells of the main body and the circuit board.

11. The pressure sensor as claimed in claim 10, wherein each half shell includes a third joining geometry and a fourth joining geometry, the third joining geometry of each half shell configured to cooperate with the fourth joining geometry of the other half shell to locate the half shells with respect to each other.

12. A method for producing a connection device for a pressure sensor that has a supporting unit that includes a multi-part base body having two half shells, a circuit board that is electrically and mechanically connected to the multi-part base body of the supporting unit via at least one solder connection, and an electronic circuit supported by the circuit board, and having at least one component that is at least one of electronic and electrical, the supporting unit defining an external interface having at least one electrical contact site that enables tapping at least one electrical output signal of the electronic circuit, and the at least one electrical contact site electrically connected to at least one corresponding contact site of the circuit board, the method comprising:
electrically and mechanically connecting the half shells to the circuit board when populating the circuit board with the at least one electronic component.

* * * * *